United States Patent
Xu et al.

(10) Patent No.: US 10,860,211 B2
(45) Date of Patent: Dec. 8, 2020

(54) MODULARIZED MULTI-PURPOSE STORAGE SYSTEM

(71) Applicant: Western Digital Technologies, Inc., San Jose, CA (US)

(72) Inventors: Jun Xu, Singapore (SG); Brandon Dement, Aliso Viejo, CA (US); Scott A. Rader, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 173 days.

(21) Appl. No.: 15/890,265

(22) Filed: Feb. 6, 2018

(65) Prior Publication Data
US 2019/0243551 A1    Aug. 8, 2019

(51) Int. Cl.
| | | |
|---|---|---|
| *G06F 12/00* | (2006.01) |
| *G06F 13/00* | (2006.01) |
| *G06F 13/28* | (2006.01) |
| *G06F 3/06* | (2006.01) |
| *G11B 33/12* | (2006.01) |
| *G06F 13/40* | (2006.01) |
| *G06F 11/14* | (2006.01) |
| *H04L 29/08* | (2006.01) |
| *G06F 1/16* | (2006.01) |
| *G06F 16/185* | (2019.01) |
| *G06F 15/78* | (2006.01) |

(52) U.S. Cl.
CPC .......... *G06F 3/0607* (2013.01); *G06F 1/1633* (2013.01); *G06F 11/1451* (2013.01); *G06F 11/1456* (2013.01); *G06F 13/4081* (2013.01); *G06F 16/185* (2019.01); *G11B 33/125* (2013.01); *H04L 67/1097* (2013.01); *G06F 15/7896* (2013.01)

(58) Field of Classification Search
CPC ........................... G06F 3/0607; G06F 15/7896
USPC ......................................................... 711/114
See application file for complete search history.

(56) References Cited

U.S. PATENT DOCUMENTS

| | | |
|---|---|---|
| 7,762,470 B2 | 7/2010 | Finn et al. |
| 8,996,795 B2 | 3/2015 | Mardiks et al. |

(Continued)

OTHER PUBLICATIONS

Drobo 5N, "The Easier Drobo for Your Network," retrieved from http://www.drobo.com/storage-products/5n/ Feb. 5, 2018 (5 pages).

(Continued)

*Primary Examiner* — Michael Alsip
*Assistant Examiner* — Sidney Li
(74) *Attorney, Agent, or Firm* — Patent Law Works LLP

(57) ABSTRACT

An example system may comprise a network-attached storage device including a base station having a hardware interface including a drive port and a connectivity port; a modular storage drive attachable to and detachable from the drive port; and a modular wireless adapter attachable to and detachable from the connectivity port. The portable storage device is formable by detaching the modular storage drive and the modular wireless adapter from the hardware interface of the network-attached storage device, and coupling the modular storage drive and the modular wireless adapter to one another via a portable hardware interface. Further, a rechargeable modular power unit is removable from the base station and attachable to and detachable from a power port of the network-attached storage device.

20 Claims, 8 Drawing Sheets

(56) References Cited

U.S. PATENT DOCUMENTS

| | | | |
|---|---|---|---|
| 9,104,384 B2 | 8/2015 | Schade | |
| 2009/0276643 A1* | 11/2009 | Saito | G06F 1/30 713/300 |
| 2009/0292852 A1* | 11/2009 | Justice | G06F 1/187 710/303 |
| 2013/0047029 A1* | 2/2013 | Ikeuchi | G06F 11/14 714/6.22 |

OTHER PUBLICATIONS

McBride, "Removable Drive Backup Appliances Released," Jul. 13, 2012, retrieved from https://www.high-rely.com/blog/removable-drive-backup-appliances-released/ (2 pages).

Orico 6619US3 SuperSpeed USB3.0 SATA Hard Drive Docking Station, retrieved from http://www.asianic.com.ph/product/orico-6619us3-superspeed-usb30-sata-hard-drive-docking-station Feb. 5, 2018 (3 pages).

Toshiba Canvio Cast, retrieved from http://storage.toshiba.com/products/canviocast/ Feb. 5, 2018 (1 page).

2017 Guide: The Best NAS Drives for Homes and Small Offices, retrieved from http://www.computershopper.com/feature/2017-guide-the-best-nas-drives-for-homes-and-small-offices May 15, 2017 (13 pages).

* cited by examiner

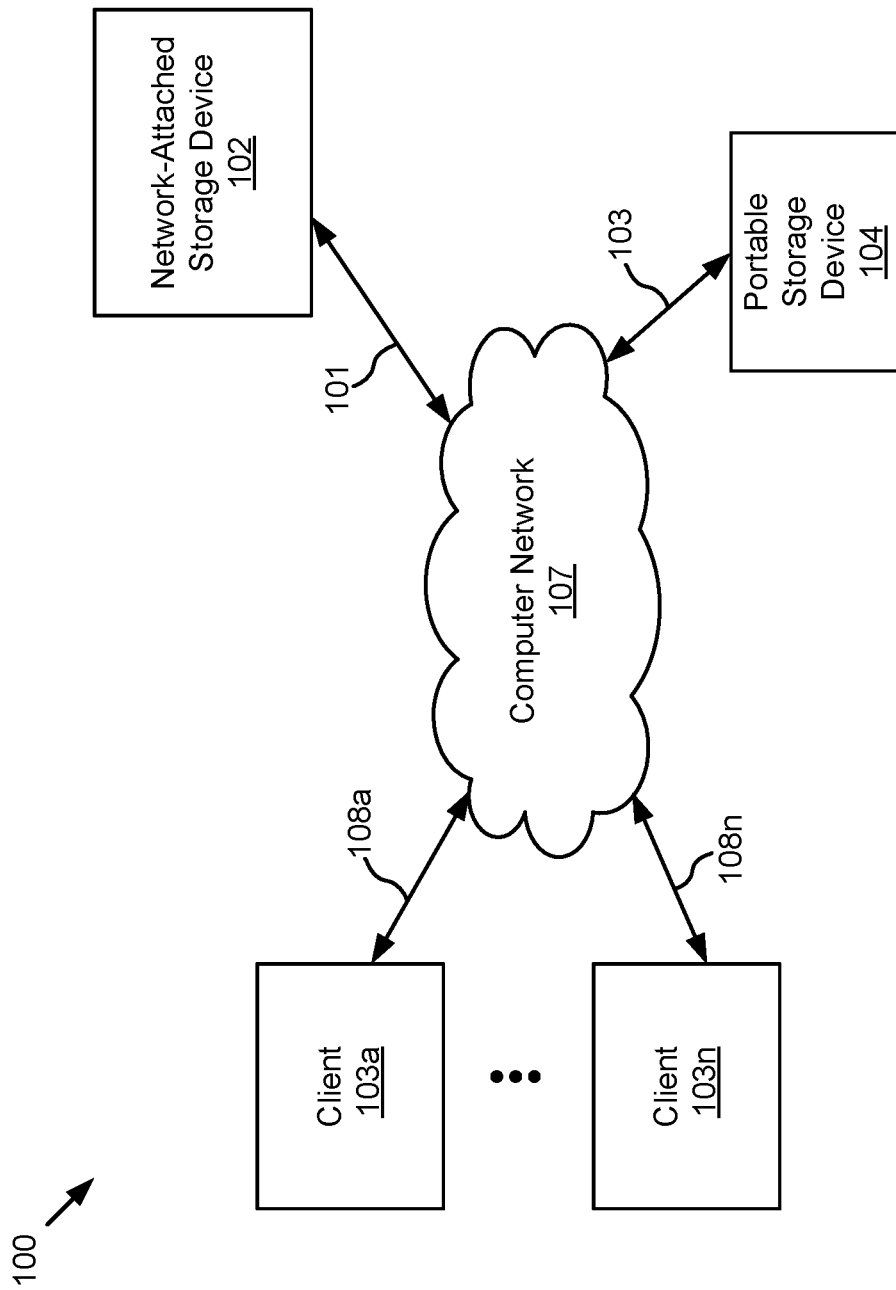

400

Receiving storage request
402

Detecting that temporary storage device is coupled to hardware interface
404

Servicing storage request by staging data on temporary storage device
406

Detecting coupling of modular storage drive to hardware interface of network-attached storage device
502

Destaging data from temporary storage device to modular storage drive responsive to coupling
504

Fig. 5

MODULARIZED MULTI-PURPOSE STORAGE SYSTEM

BACKGROUND

The present disclosure relates to data storage.

Computer applications are increasingly using, generating, and storing larger and larger amounts of data, which can range from digital photos, videos, word processing files, movies, to application databases and files backing the various operating system and user applications. A household or small business often have large amounts of data backed-up in a centralized repository, which may be stored on external drives, internal drives, network drives, cloud drives, etc. However, accessing these files and backing up new files that are created to the centralized repository can be problematic at times, particularly when one is on-the-go.

One solution is to use a portable solid state drive that has a large enough storage capacity to store the files desired by the user, whether it be all or a portion of the total files the user has. Some such portable solid state drives have dedicated wireless modules that can broadcast a wireless hotspot for use by a nearby user to write files to the drive, such as a photographer that is capturing photos of a subject during a photoshoot and writing the files wirelessly to the drive. However, such a drive is limited because when the user wishes to back up the new files written to the portable drive, he/she is generally required to manually back up the drive to a separate storage device, such as a personal computer, cloud drive, network drive, etc.

As such, the user is required to maintain multiple disparate storage repositories, which can be time consuming and complex. Additionally, it can be easy to forget or procrastinate backing up the files from the portable drive to a centralized repository, and as such, users often experience data loss as a result (due to failure, forgetfulness, technical inability, etc.).

Additionally, while cloud storage services provide some functionality in terms of automated back-up, such services carry disadvantages, such as inaccessibility in remote areas and during outages. These services also require paid subscriptions for storing the volumes of data that most consumers and business need or would like to store, often at significant expense when compared to storing data locally on drives owned by users. Additionally, storing data over the Internet to a cloud repository, when compared to a direct data connection or local provide network, is generally significantly slower. It can also cause consumers to overrun monthly, yearly, etc., data caps on Internet access that may be in place, which can also cause significant frustration in applicable cases.

SUMMARY

The present disclosure relates to data storage devices and more particularly, to a portable storage device which is formed form modules detached from a network-attached storage device. According to one innovative aspect of the subject matter in this disclosure, a modular storage system comprises a base station having a hardware interface including a drive port and a connectivity port, a modular storage drive attachable to and detachable from the drive port, and a modular wireless adapter attachable to and detachable from the connectivity port. The modular storage system further comprises a portable storage device formable by detaching the modular storage drive and the modular wireless adapter from the hardware interface of the network-attached storage device, and coupling the modular storage drive and the modular wireless adapter to one another via a portable hardware interface.

In another innovative aspect, a portable storage device may comprise a modular storage drive detached from a network-attached storage device; a modular wireless adapter detached from the network-attached storage device and attached to the modular storage drive via a hardware interface; and a rechargeable modular power unit detached from the network-attached storage device and attached to the modular wireless adapter and the modular storage drive via the hardware interface, the modular storage drive, the modular wireless adapter, and the rechargeable modular power unit being detachable from one another and reattachable to the network-attached storage device.

In yet another innovative aspect, a method may comprise receiving a storage request; detecting that a portable storage device is accessible via a computer network by a network-attached storage device, the portable storage device comprising a modular storage drive detached from a hardware interface of the network attached storage device and a modular wireless adapter detached from the hardware interface of the network-attached storage device; and servicing the storage request by one of writing data from the network-attached storage device to the modular storage drive of the portable storage device via the computer network, and reading data to the network-attached storage device from the modular storage drive of the portable storage device via the computer network.

Other implementations of one or more of these aspects include corresponding systems, apparatus, and computer programs, configured to perform the actions of the methods, such aspects having the methods encoded on computer storage devices.

These and other implementations may optionally include one or more of the following features, such as, but not limited to: that a rechargeable modular power unit is coupleable to the modular storage drive and the modular wireless adapter via the portable hardware interface; that the rechargeable modular power unit provides power to the portable storage device when detached from the network-attached storage device and coupled via the portable hardware interface; that the rechargeable modular power unit provides backup power to the network-attached storage device when attached to the hardware interface of the network-attached storage device; that the network-attached storage device further comprises a temporary non-transitory storage device is coupleable to the hardware interface; that a processor is coupled to the hardware interface, the processor executing logic that performs operations comprising: receiving a storage request; detecting that the temporary non-transitory storage device is coupled to the hardware interface, the temporary non-transitory storage device functioning as a fallback for the modular storage drive when the modular storage drive is detached from the hardware interface; and servicing the storage request by staging data on the temporary storage device; that the logic further performs operations comprising: detecting a coupling of the modular storage drive to the hardware interface of the network-attached storage device, and destaging data from the temporary non-transitory storage device to the modular storage drive responsive to the coupling; that the logic further performs operations comprising: receiving a storage request; detecting that the portable storage device is accessible via a computer network; and servicing the storage request by one of writing data from the network-attached storage device to the modular storage drive of the portable storage device via the computer network, and reading data to the network-attached storage device from the modular storage drive of the portable storage device via the computer network; that the network-attached storage device further comprises one or more storage drives coupled via the hardware interface to the processor, the one or more storage drives and the modular storage drive of the portable storage device comprising a redundant array of independent disks (RAID); that the storage request is a write request and the operations of the logic further comprise distributing data across the modular storage drive and one or more of the one or more storage drives of the RAID; that the storage request is a read request and the operations of the logic further comprise reconstructing data from the modular storage drive and one or more of the one or more storage drives of the RAID; that the drive port comprises one of a universal serial bus (USB) interface, a serial advanced technology attachment (SATA) interface, an integrated drive electronics (IDE) interface, an enhanced IDE (EIDE) interface, a peripheral component interconnect (PCI) interface, a fibre channel interface, a Thunderbolt™ Interface, and a serial-attached SCSI (SAS) interface; that the portable storage device further comprises a processor executing logic that performs operations comprising: detecting a coupling of the modular storage drive, the modular wireless adapter, and the rechargeable modular power unit via the hardware interface; broadcasting a identifier (ID) identifying the portable storage device on a computer network for detection by the network-attached storage device; and establishing a connection between the portable storage device and the network-attached storage device responsive to the detection by the network-attached storage device; that the operations of the logic of the portable storage device further comprise: receiving, at the portable storage device, a storage request from the network-attached storage device via the connection; and servicing the storage request using the modular storage drive of the portable storage device; that the modular storage drive of the portable storage device is a member of a RAID managed by the network-attached storage device, the RAID including the modular storage drive and one or more storage drives attached to the network-attached storage device; and the storage request is a write request issued by a RAID controller of the network-attached storage device, and servicing the storage request comprises storing a portion of a distributed data set on the modular storage drive, the portion of the distributed data corresponding to one or more other portions of the distributed data set stored on one or more of the one or more other storage drives of the RAID; that the modular storage drive of the portable storage device is a member of a RAID managed by the network-attached storage device, the RAID including the modular storage drive and one or more storage drives attached to the network-attached storage device; that the storage request is a read request issued by the RAID controller of the network-attached storage device, and servicing the storage request comprises reconstructing data from the modular storage drive and one or more of the one or more storage drives of the RAID; that the operations of the logic of the portable storage device further performs operations comprising: detecting, by the portable storage device, a storage request from a client device; and servicing the storage request from the client device, wherein servicing the storage request from the client device comprises one of wirelessly reading data from the modular storage drive of the portable storage device and wirelessly writing data to the modular storage drive of the portable storage device; that hardware interface of the portable storage device is integral with one of the modular storage drive, the modular wireless adapter, and the rechargeable modular power unit; that the hardware interface is an independent component that couples the modular storage drive, the modular wireless adapter, and the rechargeable modular power unit, wherein the hardware interface comprises: a drive port for coupling and decoupling the modular storage drive; a connectivity port for coupling and decoupling the modular wireless adapter; and a power port for coupling and decoupling the rechargeable modular power unit; that the method further comprises: detecting that a temporary storage device is coupled to the hardware interface of the network-attached storage device, the temporary storage device functioning as a fallback for the modular storage drive detached from the hardware interface of the network-attached storage device; and servicing the storage request by staging data on the temporary storage device; that the method further comprises: detecting a coupling of the modular storage drive to the hardware interface of the network-attached storage device; and destaging data from the temporary storage device to the modular storage drive responsive to the coupling.

These and other implementation are advantageous in a number of respects, such as automatically synchronizing new files to a back-up repository without consumers having to expressly take action; providing a modular, multi-use/multi-purpose storage system that can be configured as two or more separate storage systems that are capable of using one another's capabilities virtually, allow for a storage drive to be moved from the NASD while still maintaining the integrity of the data on the NASD and some or all of the storage the functionality of the NASD, automatically downgrading storage functionality when needed, etc.

It should be understood that the above list of features and advantages is not all-inclusive and many additional features and advantages are contemplated and fall within the scope of the present disclosure.

Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1 is a block diagram of an example network architecture that includes an example network-attached storage device (NASD) and portable storage device.

FIG. 4 is a flowchart of an example method for staging data on a temporary storage device coupled to a NASD.

FIG. 5 is flowchart of an example method for destaging data from a temporary storage.

DETAILED DESCRIPTION

Figure 2A:
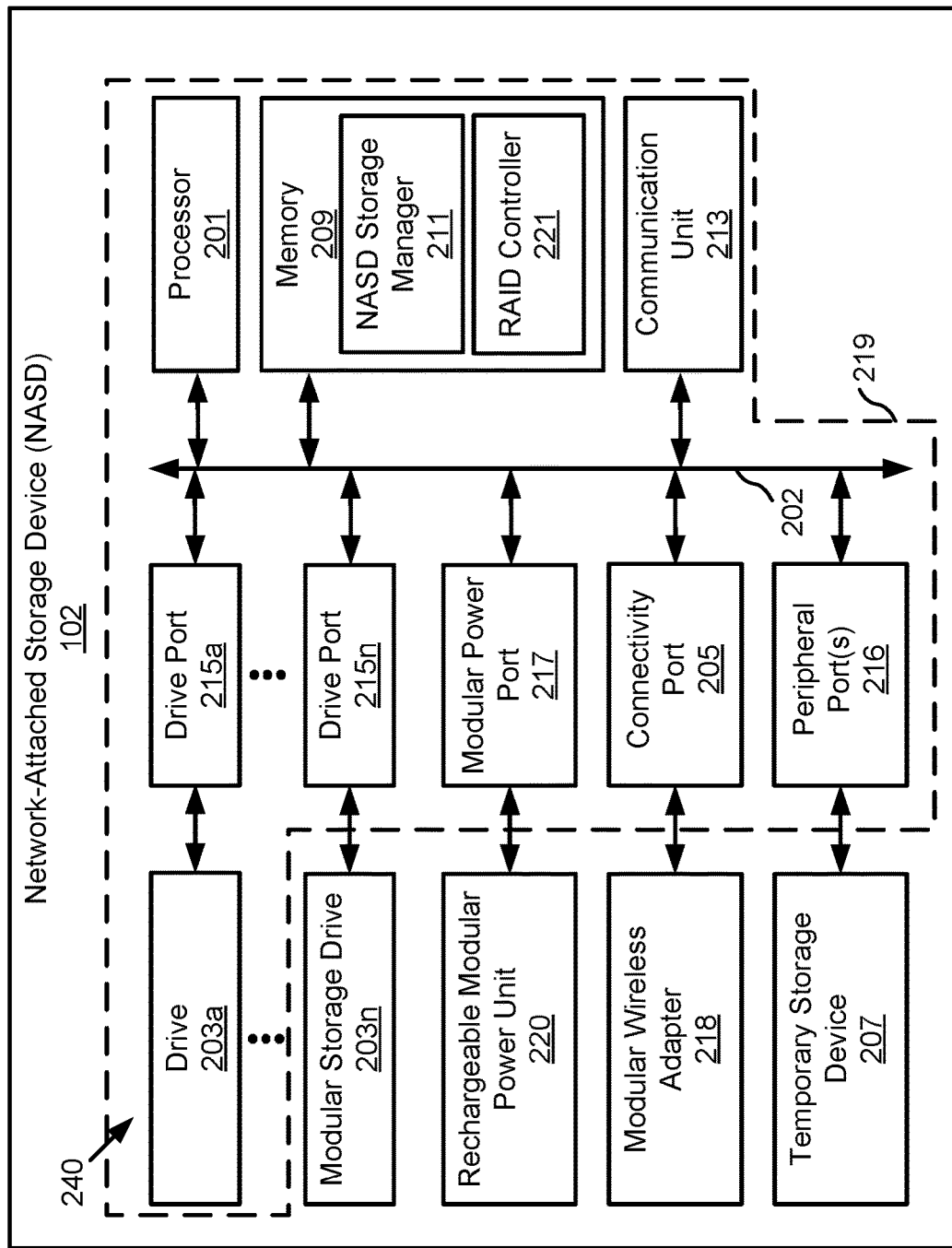
FIG. 2A is a block diagram of the architecture of an example NASD.

The present disclosure describes a novel, multi-use, modular storage technology, which may include methods, systems, apparatuses, computer program products, and other aspects. By way of example, the technology includes a network-attached storage device (NASD) (also referred to as a network-attached storage (NAS) device) that has modular components, such as, but not limited to, a modular storage drive, a rechargeable modular power unit, a modular wireless adapter, etc., that can be detached from ports of the NASD, and put together to form a portable storage device that can be carried by the user on the go. The portable storage device formed from the foregoing modular components may in some cases include wireless communication functionality to stay in contact with the NASD and/or communicate with any other suitable devices. Numerous additional details and advantages are discussed further herein.

FIG. 1 is a block diagram of an example network architecture 100 that includes a NASD 102, a portable storage device 104 formable from the NASD 102, and a plurality of clients 103A . . . 103N coupled via a computer network 107. The computer network 107 (also simply referred to as network 107 in some cases) shown in FIG. 1 interconnects, as shown by signal lines 101, 103, and 108a . . . 108n, the NASD 102, the portable storage device 104, and clients 103a . . . 103n, respectively. The computer network 107 can be a conventional or unconventional type, wired or wireless, and may have numerous different configurations. For instance, the network 107 may include network(s) having any of a variety of network types, including local area networks (LANs), wide area networks (WANs), wireless networks, virtual private networks, wired networks, the Internet, personal area networks (PANs), near field networks (e.g. Bluetooth®, NFC, etc.), object buses, computer buses, and/or a combination of any suitable communication mediums via which devices may communicate in a secure or insecure fashion.

Data may be transmitted via the network 107 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (e.g., SMS, MMS, XMS, IMAP, SMTP, POP, WebDAV, etc.), or other suitable protocols.

Although FIG. 1 illustrates the network 107 as a single block, it should be understood that it represents one or more networks as discussed above.

Clients 103a . . . 103n (also referred to individually or collectively as simply as 103 in some cases), may comprise an electronic computing device, such as a personal computer (PC), a laptop, a smartphone, a tablet, a mobile phone, a smart camera, a wearable electronic device, server, server appliance, or any other electronic device or computing system capable of communication with the computer network 107. The client 103 may store one or more client applications in non-transitory memory. A client application may be executable by a computer processor of the client 103. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client 103 may include an application for creating, modifying, and deleting objects, which may be stored in object storage (not shown). For instance, the application may be specifically customized for communication with third-party applications (also not shown) and/or storage applications (also not shown) of the NASD 102 and the portable storage device, such as an application adapted to configure and/or utilize programming interfaces of storage applications of the NASD 102 and/or the portable storage device 104.

The client 103 may send/receive requests and/or send/receive responses, such as but not limited to HTTP(S) requests/responses, to/from one another, from the NASD 102, and from the portable storage device 104. A client 103 may present information, such as visual, audio, tactile, and/or other information via output devices, such as displays, audio reproduction devices, vibration mechanism, etc., based on information generated by client 103 and/or received from other devices coupled to the computer network 107.

In some embodiments, a client application (e.g., a client application executing on a client 103) may send a request (also referred to as a storage request) to the portable storage device 104 to store, update, delete, or retrieve a particular file stored at the portable storage device 104 and/or the NASD 102 through the computer network 107. For example, a user (not shown) may update a document using a word processing application and may save the updated version to the portable storage device 104, and/or the NASD 102.

FIG. 2A is a block diagram of the architecture of an example NASD 102. As shown, the NASD 102 includes a plurality of drives 203a . . . 203n (also referred to individually or collectively as simply as 203 in some cases), a plurality of corresponding drive ports 215a . . . 215n (also referred to individually or collectively as simply as 215 in some cases), rechargeable modular power unit 220, a modular wireless adapter 218, a temporary storage device 207, corresponding ports such as a modular power port 217, a connectivity port 205, one or more peripheral port(s) 216, a processor 201, a memory 209, and a communication unit 213, which are coupled for communication via a communication bus 202.

Drives 203a . . . 203n may be coupled to the NASD 102 via the plurality of drive ports 215a . . . 215n. The plurality of drives 203 include non-transitory storage devices of the same type, different type, or a combination of the forgoing. Non-limiting example non-transitory storage devices include solid state storage drives and hard disk drives, although any other suitable drive technology may be used and is encompassed hereby. The plurality of drives 203 may utilize any suitable bus protocol and/or interfaces, including but not limited to serial AT attachment (SATA), external SATA (eSATA), small computer system interface (SCSI), serial attached SCSI, integrated drive electronics (IDE), enhanced IDE (EIDE), Peripheral Component Interconnect (PCI), fibre channel, universal serial bus (USB), Thunderbolt™, etc. Correspondingly, the drive ports 215*a* . . . 215*n* may include any suitable types of interfaces capable of coupling the same or different drive types to the NASD 102, such as but not limited to the examples in the foregoing sentence.

In some embodiments, the NASD 102 includes a plurality of drives 203, where two or more of the drives 203 are configured as redundant array of independent disks (RAID) and the RAID controller 221 distributes data across the array based on the RAID level that is configured. Example RAID levels include, but are not limited to RAID0, a RAID1, RAID 5, RAID 6, hybrid variations of the foregoing, etc.

In some embodiments, responsive to drive 203*n* being removed, the RAID controller 221 can continue to run with no data loss in a multiple drive RAID configuration e.g., RAID5/1. In some cases, such as for RAID 5, a signal indicating the drive 203*n* is being removed is provided, and necessary data may be copied to another storage location, such as temporary storage device 207.

The RAID controller 221 includes logic (e.g., sets of instructions, software, firmware, etc.) executable by a processors, such as the processor 201, to perform the foregoing acts and/or functionality. It should be appreciated that the RAID controller may be implemented in hardware (e.g., application-specific integrated circuit (ASIC), field-programmable gate arrays (FPGA), application-specific standard parts (ASSP), system-on-chip (SoC), circuitry, etc.), software, and or a combination of the foregoing, and may use any available logic for performing RAID operations (e.g., striping, computing parities, etc.), such as any standard or proprietary logic available today or in the future.

The NASD 102 provides unique, novel multiple-devices-in-one functionality, in which modular components can be removed from the NASD 102 and used to form a portable storage device 104 that can be conveniently taken and used by the user on the go. For example, the NASD 102 may comprise a modular storage drive 203*n*, a rechargeable modular power unit 220, and/or a modular wireless adapter 218 that can be connected together to form the portable storage device 104.

In the depicted embodiment, the modular storage drive 203*n* can be conveniently decoupled from the NASD 102 and combinable with other removable modules of the NASD 102 to form the portable storage device 104. For instance, the modular storage drive 203*n* may include a first USB connector and the drive port 215*n* may include a compatible second USB connector, and the modular storage derive 203*n* may be coupled and decoupled using these detachable/reattachable USB connectors.

In the depicted embodiment, the rechargeable modular power unit 220 can be coupled to and decoupled from the NASD 102 via the connectivity port 205. In some embodiments, the rechargeable modular power unit 220 may be a modular uninterruptible power supply (UPS). In such a case, the rechargeable modular power unit 220 may be charged when coupled to the NASD 102 and may provide an independent power source to the components of the portable storage device 104 when charged and coupled to with other NASD modules to form the portable storage device.

In some embodiments, the rechargeable modular power unit 220 provide power to the portable storage device 104, which can service storage requests absent any direct power source such as an alternating currents (AC) power source or other direct current (DC) power sources (e.g., USB connection to computer).

In some embodiments, the rechargeable modular power unit 220 may be charged when the portable storage device 104 is physically coupled to an external device (not shown) other than the NASD 102. For instance, the portable storage device 104 (e.g., via the rechargeable modular power unit 220) may be directly connected to the external device via a charging cable (e.g. via a USB cable coupled to a powered device such as laptop), or placing the portable storage device proximally to the external device for wireless charging.

In some embodiments, the rechargeable modular power unit 220 may comprise a power bank (e.g. one or more rechargeable batteries for powering electronic circuitry). This power bank may have an uninterruptible power supply (UPS) manager (not shown) regulate the charging of the of the power bank. The UPS manager may, in some embodiments, be controlled by logic of the device to which it is coupled (e.g., the NASD 102 and/or the portable storage device 104.

In the depicted embodiment, the modular wireless adapter is coupleable and detachable from the NASD 102 via the connectivity port 205. The modular wireless adapter 218 may be configured to provide wireless connectivity to the device to which it is coupled. As such the modular wireless adapter can provide the NASD 102 or the portable storage device 104 wireless connectivity when coupled to it. Wireless connectivity for example, may include connectivity to the network 107 for communication with other network nodes. In a more particular example, wireless connectivity may include wirelessly reading and wireless writing data to whatever device (either the NASD or the portable storage device) to which the modular wireless adapter is connected.

The portable storage device 104 formable from the modular components of the NASD 102 can, in some embodiments, have a form factor that is easily portable and carriable by the user (e.g., in a purse, pocket, backpack, brief case, etc.). In some embodiments, the modular storage drive 203*n*, the rechargeable modular power unit 220, and/or the modular wireless adapter 218 can be connected together and operate as a portable storage device 104 independent of or in cooperation with the NASD 102, and has sufficient logic to operate independently of the NASD 102 if needed or desired.

In some embodiments, a third-party power module (e.g., rechargeable battery power brick) having a universal interface (e.g., USB) may be used in the place of the rechargeable modular power unit 220 in configurations in which a power module is desired.

Figure 3A:
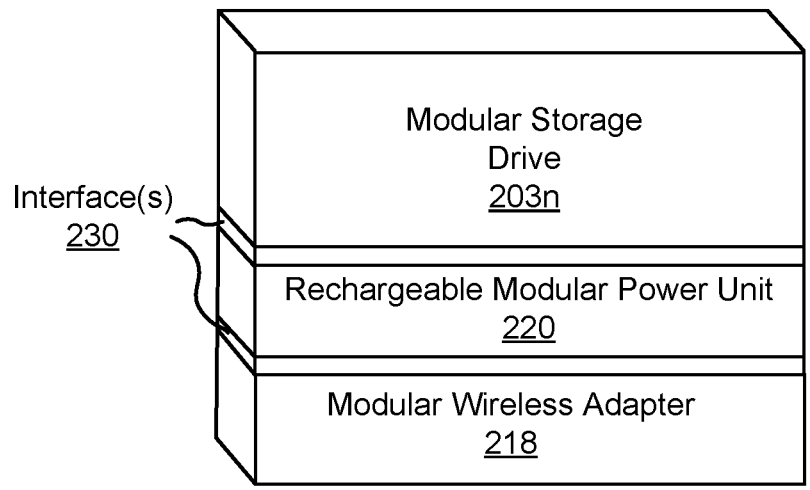
FIGS. 3A . . . 3C are diagrams illustrating the modularity of example portable storage devices.

FIGS. 3A . . . 3C are diagrams illustrating the modularity of example portable storage devices 104. In particular, FIG. 3A shows an embodiment where the modular storage drive 203*n* is coupled to the rechargeable modular power unit 220 via a first interface 230, and the rechargeable modular power unit 220 is in turn be coupled to the modular wireless adapter 218 via the interface 230. For instance, the rechargeable modular power unit 220 may include two or more ports, and the modular storage drive 203*n* may be plugged into one of the ports via corresponding connector, and the modular wireless adapter 218 may be plugged into another one of the ports via a corresponding connector (e.g., using compatible USB connectors). Once plugged in, the modular storage drive 203*n* and the modular wireless adapter 218 may power up responsive to receiving power from the rechargeable modular power unit 220, initialize their respective functionalities, and provide the acts and functionality of the portable storage device 104, which are discussed in further detail elsewhere herein.

In further examples, each of the modular storage drive 203*n*, the rechargeable modular power unit 220, and the modular wireless adapter 218 may include both male and female connectors (or other types of compatible connectors) and may be combinable in any order; the modular storage drive 203*n* may be configured to plug into a port of the rechargeable modular power unit 220, and the rechargeable modular power unit 220 may be configured to plug into the modular wireless adapter 218, via compatible ports and plugs, or vice versa. In some cases, the interface(s) 230 between the modular storage drive 203*n*, the rechargeable modular power unit 220, and the modular wireless adapter 218 may be the same or different. For instance, the interface(s) 230 may be formed in a way that requires the components to connect in a certain way, or may be universal. The interface(s) 230 may comprise any of the example interfaces discussed herein, such as, but not limited to, USB, Thunderbolt™, eSATA, etc.

Figure 3B:
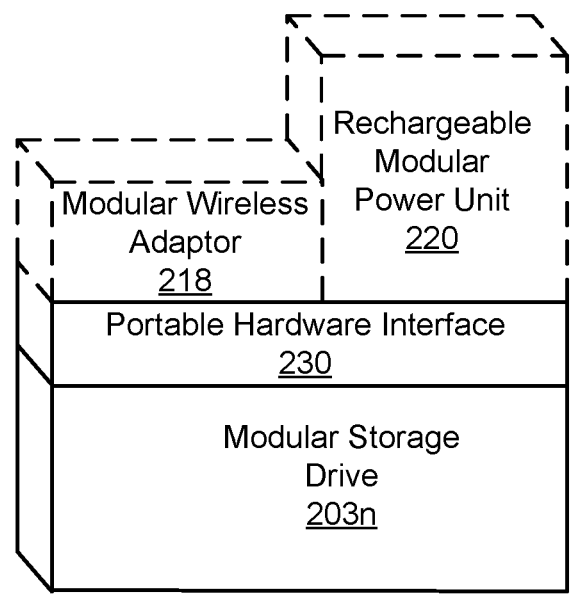

With reference to FIG. 3B, the modular wireless adapter 218 and, the rechargeable modular power unit 220 are coupled via a common portable hardware interface 230 to the modular storage drive 203*n*. For instance, the modular storage drive 203*n* may include two or more ports, and the rechargeable modular power unit 220 may be plugged into one of the ports via a corresponding connector, and the modular wireless adapter 218 may be plugged into via another one of the ports via a corresponding connector (e.g., using compatible USB connectors). Once plugged in, the modular wireless adapter 218 and the modular storage drive 203*n* may receive power from the rechargeable modular power unit 220, initialize their respective functionalities, and provide the acts and functionality of the portable storage device 104, which is discussed in further detail elsewhere herein.

In further examples, the portable hardware interface 230 of FIG. 3B may include an independent unit with both male and female connectors (or other types of compatible connectors/ports) and may couple the modular wireless adapter 218, the rechargeable modular power unit 220, and the modular storage drive 203*n* in any order. In some cases, the connectors/ports may be of the same type or different types and may be configured to have one or more other interface members that are compatible with the rechargeable modular power unit 220, the modular wireless adapter 218 and the modular storage drive 203*n*. The interface 230 of FIG. 3B may also comprise any of the example interfaces discussed elsewhere herein.

Figure 3C:
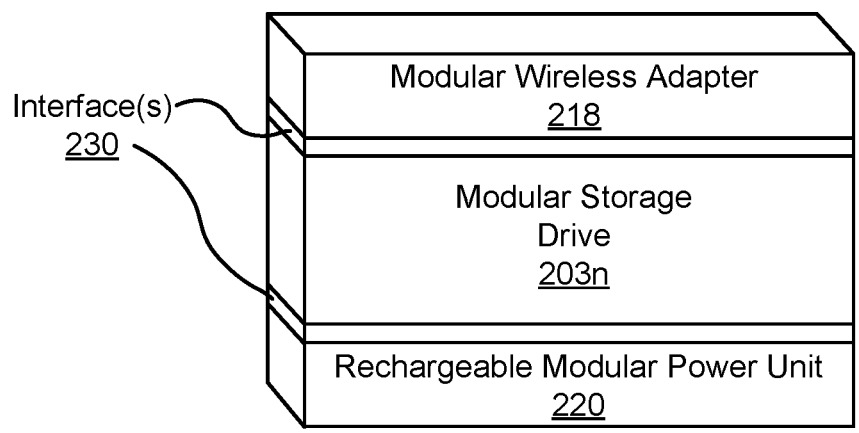

FIG. 3C shows an embodiment where the modular wireless adapter 218 is coupled to the modular storage drive 203*n* via an interface(s) 230, and the modular storage drive 203*n* is in turn coupled to the rechargeable modular power unit 220 via another interface(s) 230. For instance, the interface(s) 230 may be integral to the modular storage drive 203*n*, in which case the modular wireless adapter 218 is connected to an interface of the interface(s) 230 integral to the modular storage drive 203*n*, and the rechargeable modular power unit 220 is connected to another interface of the interface(s) integral to the modular storage drive. Another example of the coupling shown in FIG. 3C may be an interface 230 integral to the modular storage drive 203*n* to which the modular wireless adapter 218 is coupled, and another interface 230 that is integral to the rechargeable modular power unit 220 to which the modular storage drive 203*n* is in turn coupled. In any case, in the foregoing, the interface(s) 230 may comprise two or more interface members that may be integral to the modular wireless adapter 218, the modular storage drive 203*n* and the rechargeable modular power unit 220, and/or a combination of these. Interface(s) 230 may, in some instances, comprise interface members that are not integral (e.g., that are independent of the modular wireless adapter 218, the modular storage drive 203*n* and the rechargeable modular power unit 220) to the modular wireless adapter 218, the modular storage drive 203*n* and the rechargeable modular power unit 220. Again, the interface(s) 230 may be the same or similar to the interface(s) described elsewhere herein.

As discussed elsewhere herein, the interface(s) 230 coupling the modular storage drive 203*n*, the rechargeable modular power unit 220 and the rechargeable modular power unit 220 may be similar or different interface(s). Additionally, the interface(s) 230 may be integral either to the modular wireless adapter 218, the rechargeable modular power unit 220, or the modular storage drive 203*n*. In some embodiments, the interface(s) is/are a separate module(s) that may not be integral to the modular wireless adapter 218, the rechargeable modular power unit 220, or the modular storage drive 203*n*.

Turning again to FIG. 2A, the border illustrated by dashed line 219 segments, on the one hand, the modular components that can either be combined to form the portable storage device 104 or other peripherals plugged into a base station of the NASD 102, such as the temporary storage device 207, and on the other hand, the core components comprising the base station of the NASD 102 that are used by the NASD 102 to provide computing and storage functionality, such as a hardware interface that comprises various ports (e.g., 215, 217, 206, and/or 216, etc.) and/or a bus 202, one or more storage devices (e.g., storage drive(s) 203), one or more communication unit(s) 213, one or more memor(ies) 209, and/or one or more processor(s) 201, etc. The hardware interface may comprise a single or a plurality of communication and/or power components (e.g., wired and/or wired interfaces, communication and/or power port(s), communication bus(es), etc.), which may be integrated components, integral components, separate components that are coupled, a combination of the foregoing, etc.

The operation of the NASD 102 can automatically be adapted to use account for the modular components that are present or removed from the NASD 102. For example, the NASD 102 may operate in a normal mode when all the drives 203 (including the modular storage drive 203*n*) are available to the NASD 102 to service storage requests. In some embodiments the NASD 102 may switch to a degraded mode when the modular storage drive 203*n* is detached from it. In such a case, if the temporary fallback for the modular storage drive 203*n* is unavailable, then certain functionalities of the NASD 102 may be limited relative to their normal operation when the modular storage drive 203*n* is attached and/or accessible via a wireless link (e.g. a previously configured RAID of the NASD becomes altered when one of the disks of the RAID becomes unavailable). As such the NASD storage manager 211 may adapt the storage functionality of the NASD 102 to account for loss of one or more of its modules.

The NASD 102 may provide network storage access to other computing nodes, such as clients 103*a* . . . 103*n* and/or the portable storage device 104. In some cases, the NASD 102 may comprise a base station that hosts a centralized data repository and various clients 103*a* . . . 103*n* may retrieve various data needed or desired by them from the drive(s) 203, delete data stored in drive(s) 203, and/or write data to the drive(s) 203. For instance, the NASD 102 may host the multi-media files and/or personal documents for a household and applications operating on the clients 103 may access, alter, and/or delete various of the files and/or documents. In some cases, the NASD 102 may regulate access control to the files hosted by it based on an access control list designating which users are authorized to perform various different storage operations on the files. The NASD 102 may further include any standard, available logic, structure, and/or functionality for providing the network-accessible storage capabilities described herein.

In some embodiments, the NASD 102 may comprise a micro-server running a plurality of applications, multi-media, web, and/or any other applications. The NASD 102 may include ports/interfaces (e.g., 216) for coupling display devices such as monitors, input devices such as a computer mouse or a computer keyboard, output devices (e.g., speakers, printers, etc.) and any other computer peripherals as needed.

In a frequent NASD usage scenario, a first user sit at and operate the NASD 102 as a personal computer, using the display to view information presented by it and one or more input devices to input information into the NASD 102. For instance, the first user may process some documents (e.g. MS office documents, multimedia documents, etc.) using the NASD 102, and store the processed documents on the modular storage drive 203n of the NASD 102. The first use may also store photographs and digital movies on the modular storage drive 203n and/or one or more of the other drive(s) 203 of the NASD 102. As a later point in time, the user may then decouple the modular storage drive and one or more other modules of the NASD 102, such as the rechargeable modular power unit 220 and the modular wireless adapter 218 from the modular power port 217 and the connectivity port 205 of the NASD 102, respectively. Now independent of the NASD 102, the user may then couple these detached components together and take the portable storage device 104 to a remote location (relative to the NASD 102) and used it to access and/or store data therefrom.

In some cases, the first may connect other client devices such as smart cameras, smart phones, and the like, to the portable storage device 104 (e.g., via the network 107, via a direct data connection (e.g., USB port of the modular storage drive 203n, etc.)). These devices may read, deleted, write, etc., data to the modular storage drive 203n of the portable storage device 104.

In some embodiments, the portable storage device 104 or the NASD 102 can connect to the other via the computer network 107. For instance, the NASD 102 may detect a unique ID that may be broadcast by the modular wireless adapter 218 of the portable storage device 104. Using the unique ID, the NASD storage manager 211 may uniquely identify the portable storage device 104 on the network 107 and (e.g., in some cases automatically) establish a connection with it. Alternatively or alternatively, in some embodiments, the NASD 102 may broadcast its unique ID and the portable storage manager 212 of the portable storage device 104 may uniquely identify the NASD 102 and connect with it via the network 107.

Based on the strength of the connection (e.g., the network connection is fast enough with very minimal latency for reliable communication of files from the drive 203n of the portable storage device 104 to the NASD 102, or vice versa).

In some embodiments, the NASD 102 may treat the modular storage drive 203n of the detected portable storage device 104 on the computer network 107 as a virtual drive, and consider to be a native drive (e.g., a drive directly coupled to the NASD 102 via one of the drive ports 215). In these embodiments, if the modular storage drive 203n is part of a fault tolerant scheme, such as a RAID of the NASD 102, the fault tolerance scheme of the NASD 102 can be maintained even when the modular storage drive 203n is detached from the NASD 102 provided the network connectivity between the NASD 102 and the portable storage device 104 is sufficiently reliable, which the RAID controller 221 may monitor and manage (e.g., by monitoring packet rates, packet loss, latency, etc.).

Continuing the above example, the first user is unable to connect to the NASD 102 for one reason or the other (e.g. poor network connection, lack of power access for either the NASD 102 or the portable storage device 104), the NASD 102 may temporarily rely on the temporary storage device 207, if available, to function as a temporary fallback for the modular storage drive 203n. Thus, a second user may also operate the NASD 102 as a mini personal computer like the first user. After the first user recouples the modular storage drive 203n to the NASD 102, the data that may be on the temporary storage device from the usage by the second user may then be restored to the modular storage drive 203n.

In some cases, via the network 107, a user may connect other clients such as smart cameras, smart phones, and the like, to the portable storage device 104. These devices may read, deleted, write, etc., data to the modular storage drive 203n of the portable storage device 104.

Figure 2B:
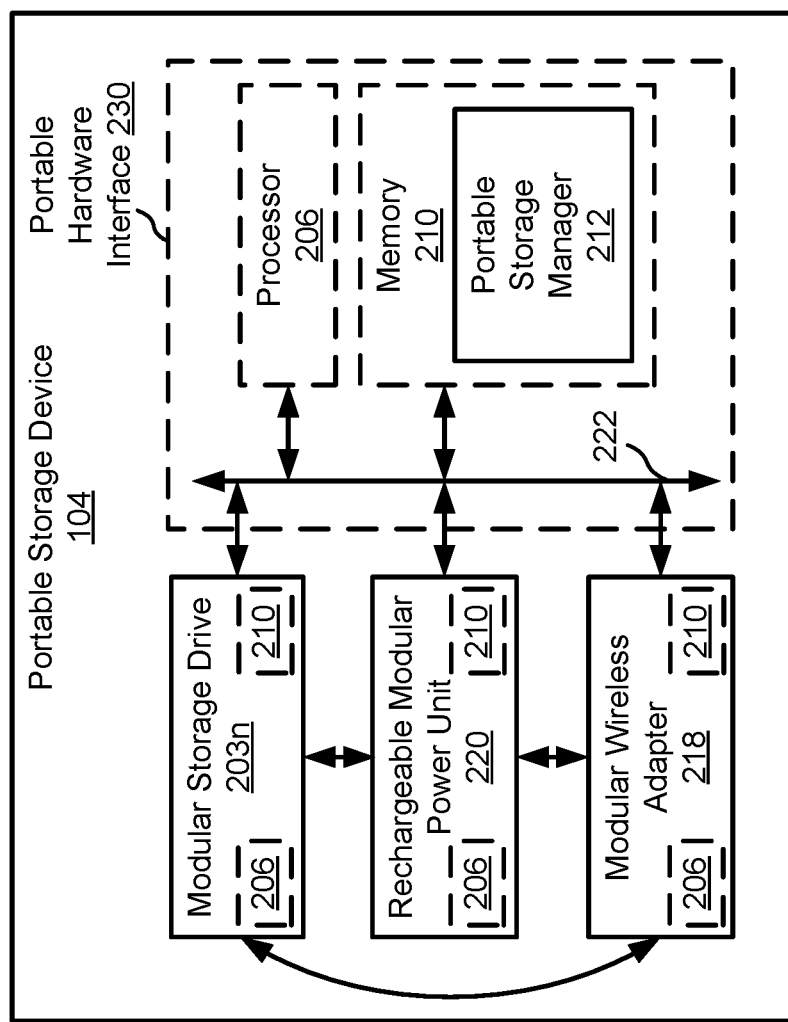
FIG. 2B is a block diagram of the architecture of a portable storage device.

The modular storage drive 203n may, in some embodiments, have modules such as memory 210 and processor 206 residing on it as shown in FIG. 2B to facilitate the operation of the portable storage device 104. As discussed above, the modular storage drive 203n may belong to a RAID managed by the RAID controller of the NASD 102. In such cases, the portable storage manager 212, as shown in FIG. 2B, can communicate with the NASD storage manager 211 of the NASD 102 to service RAID storage requests, as described in conjunction with the flowcharts described below.

It should be understood that the modular storage drive 203n, the rechargeable modular power unit 220, and/or the modular wireless adapter 218 represent some of the possible modular components that are contemplated, and that this disclosure encompasses other suitable modularized components that can be connected to the modular storage drive 203n, and in some embodiments, one or more of the modular wireless adapter 218 and the rechargeable modular power unit 220 to provide additional and/or alternative portable functionality.

As depicted, The modular storage drive 203n, the rechargeable modular power unit 220, and the modular wireless adapter 218, all of which have their functionalities described in conjunction with FIG. 2A, may be directly coupled to each other as shown in FIG. 2B and as shown and described in FIGS. 3A . . . 3C.

The temporary storage device 207 may be coupled to the NASD 102 via one of the one or more peripheral port(s) 216 of the NASD 102. In some embodiments, the temporary storage device 207 is non-transitory storage device, such as a thumb drive (e.g., flash drive, universal serial bus (USB) drive, or the like).

In some embodiments, the temporary storage device 207 may be detachable from the NASD 102 without altering the operation of the NASD 102. When coupled to the NASD 102, the temporary storage device 207 may operate as a fallback drive for a detached modular storage drive, such as the modular storage drive 203n of FIG. 2B, which at the time, may be detached and coupled to other detachable modules of the NASD 102 to form the portable storage device 104.

In such a fallback scenario, responsive to the NASD 102 receiving a storage request involving the modular storage drive 203n (which may not be readily available for access by the NASD 102) (e.g., because of being detached from the NASD 102, unavailable via a wireless link, etc.), the NASD storage manager 211 of the NASD 102 can detect the absence of the modular storage drive 203n and configure the temporary storage device 207 to emulate the acts and/or functionality of the modular storage drive 203n to provide an essentially seamless user experience (e.g., by operating in a manner similar to the modular storage drive 203n had it been accessible to the NASD 102).

Later, when the modular storage drive 203n is again coupled to the NASD 102, the NASD storage manager 211 may detect this recoupling of the modular storage drive 203n to the NASD 102, and automatically or upon confirmation, synchronize the temporary storage device 207 and the modular storage drive 203n. For instance, the NASD storage manager 211 may transfer any data written to and/or modified on the temporary storage device 207 to the recoupled modular storage drive 203n. This may comprise staging data on the temporary storage device 207 by the NASD 102 when the modular storage drive 203n is inaccessible by the NASD 102, and destaging data from the temporary storage device 207 to the modular storage drive 203n, when it is recoupled to the NASD 102.

In some embodiments, the temporary storage device 207 may be used for OS loading/backup/restore for the NASD 102 in addition to being a temporary substitute for the modular storage drive 103n. Further embodiments comprising a RAID including the drives 203a ... 203n may maintain the integrity of the RAID even when the modular storage drive 203n is decoupled from the NASD 102. This again may be accomplished using the temporary storage device 207 in place of the modular storage drive to keep the RAID active and servicing storage requests. In this case, when the modular storage drive 103n is recoupled to the NASD 102, the RAID data on the temporary storage device 207 may be propagated to the modular storage 102n and the RAID may operate in its standard configuration.

With reference to FIGS. 2A and 2B, the bus 202 and 222 communicatively couples the various components of the NASD 102 and portable storage device 104, respectively. The bus 202 and bus 222 each may include a communication bus for transferring data between components of their respective devices (e.g., the NASD 102 and the portable storage device 104) or between two or more NASDS, portable storage devices 104, a network bus system, a processor mesh, USB, SATA, SCSI, SAS, PCI, PCIe, etc., and/or or any other suitable type of internal and/or external communication bus for transferring data between components of a NASD, a computing device and/or storage device and/or between components of disparate components. In some embodiments, the NASD 102 and the portable storage device 104 may cooperate and communicate with other devices, such as one another, client(s) 103, etc., via a software communication mechanism implemented in association with the bus 202 and/or 222. The software communication mechanism may include and/or facilitate, for example, inter-process communication, local function or procedure calls, remote procedure calls, network-based communication, secure communication, etc.

The processor 201 and 206 may each include one or more arithmetic logic units, microprocessors, general-purpose controllers, or some other processor arrays to perform computations and provide electronic display signals to a display device. In some embodiments, the processor 201 and 206 each includes a hardware processor having one or more processing cores. The processor 201 and 206 may each be coupled to a bus (the bus 202 or 222, as the case may be), for communication with the other components. Processor 201 and 206 may each process data signals and may include various computing architectures including a complex instruction set computer (CISC) architecture, a reduced instruction set computer (RISC) architecture, or an architecture implementing a combination of instruction sets. Although only a single block is show for the processor 201 and 206 in the example of FIGS. 2A and 2B, multiple processors and/or processing cores may comprise the processor 201 or 206. It should be understood that other processor configurations are possible. In some embodiments, the processor 206 may have a lesser computation power when compared to the processor 201, and the higher processing power of the processor 201 of the NASD 102 when compared to the portable storage device's processor 206 may be a function of the plurality of components coupled and sustained by the NASD 102, although other variations are also possible and contemplated.

The memory 209 of the NASD 102 and 210 of the portable storage device 104 may each include one or more non-transitory computer-usable (e.g., readable, writeable, etc.) media, which can include any non-transitory apparatus or device that can contain, store, communicate, propagate or transport instructions, data, computer programs, software, code, routines, etc., for processing by or in connection with the processor 201 or 206 (as the case may be). For example, non-transitory memory may include, but is not limited to, dynamic random access memory (DRAM) device, static random access memory (SRAM) device, or another volatile or non-volatile memory device.

The memory 209 and the memory 210 may each store instructions and/or data that may be executed by a processor (e.g., the processor 201 or processor 206, as the case may be). The instructions and/or data may comprise code (e.g., in the form of the software embodying the NASD storage manager 211, the RAID controller 221, the portable storage manager 212, and/or a UPS manager, etc., depending on the implementation), an operating system, various software applications, drivers, databases, files, parameters, preferences, etc.

The communication unit 213 may include one or more interface devices for wired and wireless connectivity with a computer network to which the NASD 102 and other network-enabled devices such as clients 103 and portable storage device 104 may be coupled. For instance, the communication unit 213 may include, but is not limited to, CAT-type interfaces; wireless transceivers for sending and receiving signals using Wi-Fi™; Bluetooth®, cellular communications, etc.; bus interfaces; USB interfaces; proprietary connection types; various combinations thereof; etc. In some embodiments, the communication unit 213 can link the processor 201 to the network 107, which may in turn be coupled to other processing systems. The communication unit 213 can provide other connections to the network 107 and to other entities of the network architecture 100 using various standard communication protocols, including, for example, those discussed above.

For instance, the communication unit 213 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 213 can link the processor 201 to the network 107, which may in turn be coupled to other processing systems. The communication unit 213 can provide other connections to the network 107 and to other entities of the system architecture 100 using various standard communication protocols, including, for example, those discussed elsewhere, herein.

In some embodiments where the modular wireless adapter 218 is removed to form a portable storage device 104, the connectivity manager of the operating system of the NASD 102 or the NASD storage manager 211 may seamlessly migrate the connection to the communication unit 213, so that connectively with the network 107 may be maintained by the NASD 102. The communication unit 213 may, for instance, be directly (e.g., via Ethernet) or wirelessly (e.g., via Bluetooth®, WiFi™, etc.) connected to the network 107. Further, the RAID controller 221 may maintain RAID synchronization with the removed modular storage drive 203n via the connection migrated to the communication unit 213, provided the portable storage device 104 is reliably accessible via the connection (e.g., is within the same private network, is accessible via a virtual private network, is securely accessible via a public network, etc.).

The NASD storage manager 211 and the RAID controller 221 may each be implemented in hardware and/or software. In some embodiments, the NASD storage manager 211 and/or the RAID controller 221 may include may include specially configured software stored in the memory 209 and executable by the processor 201 so as to configure the processor 201. In some embodiments, the NASD storage manager 211 and/or the RAID controller 221 may include logic gates, switches, application specific integrated circuitry (ASIC), a programmable logic controller, an embedded microcontroller, and/or other suitable hardware, etc. In further embodiments, the NASD storage manager 211 and/or the RAID controller 221 may include both hardware and software aspects. Numerous other variations are also possible and contemplated.

FIG. 2B is a block diagram of the architecture of a portable storage device 104. As shown, the portable storage device 104 comprises a processor 206, a memory 210, and a modular storage drive 203n. In some embodiments, the portable storage device 104 may further comprise one or more of a rechargeable modular power unit 220 and a modular wireless adapter 218. The components of the portable storage device 104 may be coupled for communication by a communication bus 222.

The processor 206 and memory 210 may be included in a portable hardware interface 230, in the modular storage drive 203n, in the rechargeable modular power unit 22, in the modular wireless adapter 218, or a combination of any of the foregoing, depending on the configuration (e.g., which modular components are present in the portable storage device 104, whether a discrete portable hardware interface 230 is used or whether the portable interface(s) 230 are integrated into one or more of the modular components, as described, for example, with reference to FIGS. 3A-3C.

The portable storage manager 212 (including any other related logic such as the UPS manager) may be implemented in hardware and/or software. In some embodiments, the portable storage manager 212 may include may include specially configured software stored in the memory 210 and executable by the processor 206 so as to configure the processor 206. In some embodiments, the portable storage manager 212 may include logic gates, switches, application specific integrated circuitry (ASIC), a programmable logic controller, an embedded microcontroller, and/or other suitable hardware, etc. In further embodiments, the portable storage manager 212 may include both hardware and software aspects. Numerous other variations are also possible and contemplated.

The bus 222, the processor 206, and the portable storage manager 212 are discussed in further detail elsewhere herein, such as but not limited to FIG. 2A, the details of which will not be repeated here.

FIG. 4 is a flowchart of an example method 400 for staging data on a temporary storage device 207 coupled to a NASD 102. At block 402, the NASD storage manager 211 receives a storage request from a user. In some embodiments, the storage request from the user may be intended for a modular storage drive 203n that was previously coupled to the NASD 102 but is now unavailable. In such a case, the NASD storage manager 211 of the NASD 102 may configure a temporary storage device 207, coupled to the NASD 102 to function as a fallback drive for the unavailable storage device. As noted above, example fallback storage devices may include thumb drives, system memory, other external portable storage devices, etc.

At block 404, the NASD storage manager 211 can detect that the temporary storage device 207 is coupled to the hardware interface of the NASD 102. In response, the NASD storage manager 211 can service the storage request by staging data on the temporary storage device 102 as shown at block 406. In some embodiments, staging data may comprise temporarily storing data on the temporary storage device 207 in preparation for permanently storing the data on the modular storage drive 203n, as discussed in further detail elsewhere herein. In other embodiments, data might be striped onto the temporary storage drive. In this case, striping data may comprise segmenting logically sequential data, and storing consecutive segments of the striped data on the temporary storage drive 207 and one or more of the drives 203 (except the modular storage drive 203n) of the NASD 102. The striped data on the temporary storage may then be moved from the temporary storage device 207 to the modular storage drive 203n when the modular storage drive 203n is recoupled to the NASD 102 as described in the destaging process of FIG. 5.

FIG. 5 is a flowchart of an example method 500 for destaging data from a temporary storage device 207. As described above with reference to FIG. 4, the NASD storage manager 211 of the NASD 102 may stage data on the temporary storage device 207 (e.g., using the temporary storage device 207 as a temporary substitute to the modular storage drive 203n) until the modular storage drive 203n is again accessible. For instance, responsive to the portable storage device 104 being disassembled and the modular storage drive 203n being reattached to the NASD 102 (e.g., as described with reference to this FIG. 5), or responsive to the modular storage drive 203n being accessible via a suitable wireless connection via the network 107 coupling the NASD 102 to the modular wireless adapter 218 of the portable storage device 104 (which also comprises the modular storage drive 203n) (e.g., as described with reference to FIG. 6), the data may be destaged from the temporary storage device 207.

In some embodiments, the modular storage drive 203n is recoupled to the NASD 102, and the NASD storage manager 211 may detect such a coupling of the modular storage drive 203n to the hardware interface of the NASD 102, as reflected in block 502. The NASD storage manager 211 can then destage data from the temporary storage device 207 to the modular storage drive 203n in response. For instance, destaging data may include writing new or updated data from the temporary storage device 207 to the modular storage drive 203n recoupled to the NASD 102.

Figure 6:
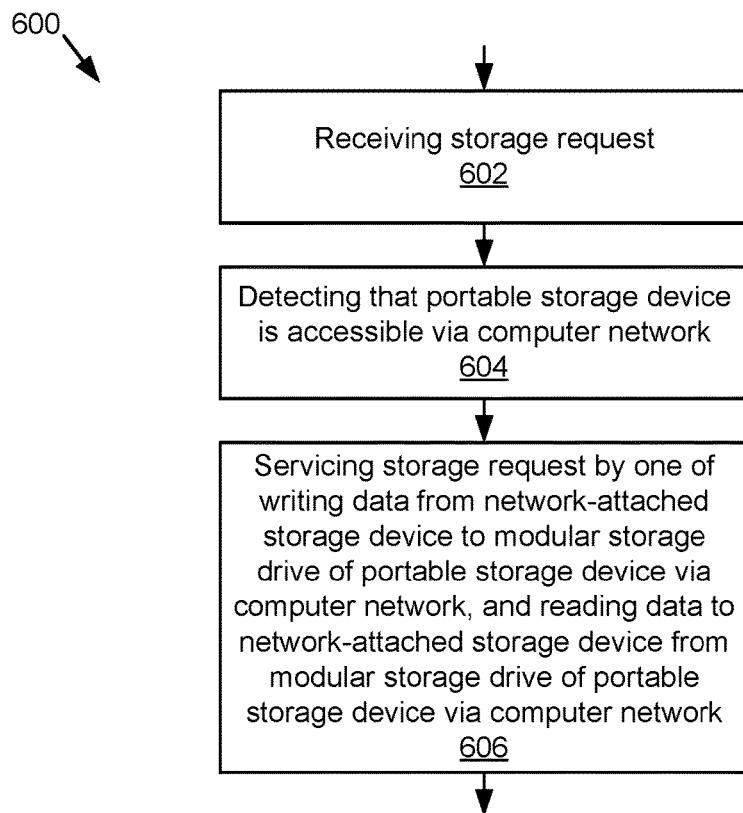
FIG. 6 is a flowchart of an example method for servicing a storage request from a NASD to a portable storage device.

FIG. 6 is a flowchart of an example method 600 for servicing a storage request from a NASD 102 to a portable storage device 104. At block 602, the NASD storage manager 211 of the NASD 102 receives a storage request. In some embodiments, the storage request may be from a user operating the NASD 102 as a mini computer to, for example, retrieve/store data to one or more of the drives 203 of the NASD 102. In other embodiments, the user may send storage requests to the NASD 102 via a client 103 via the network 107. In further embodiments, the storage request may be from a client directly coupled to the NASD 102 without requiring the network 107. The storage request may for instance, comprise reading and/or writing data to a modular storage drive 203n of the portable storage device 104. In some embodiments, reading and/or writing data associated with the storage request may comprise reading or writing data to a RAID configuration of the NASD 102 including one or more of the drives 203 of the NASD 102 and the modular storage drive 203n. In such a case, the read/write request to the NASD's RAID 240 may be serviced via the RAID controller 221 managed by the NASD storage manager 211 of the NASD 102.

Returning back to FIG. 6, the NASD storage manager 211, at block 604, may detect that the portable storage device 104 is accessible via the network 107. In some embodiments, the portable storage device 104 may broadcast an identifier which is uniquely detectable by the NASD 102 (or vice versa) via the network 107 as discussed below in conjunction with FIG. 8. In further embodiments, the broadcasted identifier by the portable storage device 104 identifies a specific modular storage drive 203n associated with a specific NASD 102. In further embodiments, the NASD 102 is configured to remotely detect and connect to the portable storage device 104 responsive to receiving a storage request from a specific portable storage device 104 associated with the NASD 102. Additional or alternative embodiments include receiving a storage request from a client 103 by the NASD 102, the storage request identifying a specific portable storage device 104 associated with a specific NASD 102 that may be detected based on the storage request, etc.

At block 606 of FIG. 6, the NASD storage manager 211 may service the storage request by one of writing data from the NASD 102 to the modular storage drive 203n of the portable storage device 104 via the network 107, and reading data to the NASD 102 from the modular storage drive 203n of the portable storage device 104 via the network 107. In some embodiments, the NASD storage manager 211 may service the storage request by querying data on the portable storage device 104, and/or performing some other storage operation in association with the portable storage device 104 (e.g., garbage collection, etc.).

The NASD storage manager 211 may collaborate with other storage managers such as the portable storage manager 212 of FIG. 2B, to service storage request. For instance, after detecting a portable storage device 104 on network 107 as described above, the NASD 102 may request a specific block of data to either be written to/read from the portable storage device 104. The portable storage manager may in turn write/read the data to the modular storage drive 203n of the portable storage device 104. In some cases, the RAID controller of the NASD 102 may communicate with a RAID controller of the portable storage manager 212 to facilitate synchronizing RAID structures of the NASD 102 and the portable storage device 104 to service RAID storage requests (e.g., as discussed with reference to FIGS. 7A and 7B). In some embodiments, the NASD 102 communicates with clients 103 to service storage requests in a manner similar or the same as it does with the portable storage device 104.

Figures 7A, 7B:
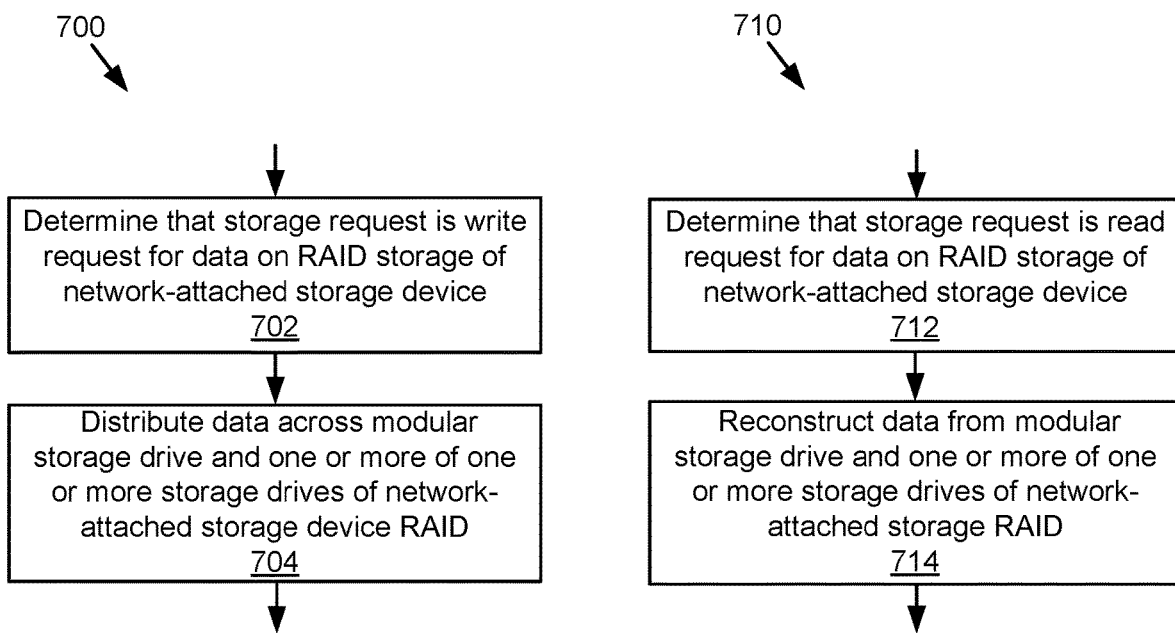
FIG. 7A is a flowchart of an example method for servicing a write request for data on a redundant array of independent disks (RAID) of the NASD.
FIG. 7B is a flowchart of an example method for servicing a read request for data on a RAID of the NASD.

FIG. 7A is a flowchart of an example method 700 for servicing a write request for data on a RAID 240 of the NASD 102. At block 702, the NASD storage manager 211 determines that a storage request is a write request for writing data on the RAID 240 of the NASD 102. As described elsewhere herein, the NASD 102 may comprise a RAID 240 including one or more drives 203 and the modular storage drive 203n of the portable storage device 104. In some embodiments, the RAID 240 configuration may be a RAID 0 requiring structuring data associated with the write request into distinct blocks and distributing the data across the drives 203 of the NASD 102. In other embodiments, the RAID 240 configuration may be a RAID 1 requiring replicating data associated with the write request across two or more of the drives 203 of the NASD 102. In further embodiments, the RAID 240 configuration may be a RAID 5 or RAID 6 requiring distributing data associated with the write request, and also parities associated with the write request on the drives 203 of the NASD. In any case write requests associated with the NASD 102's RAID may require the NASD storage manager 211 to distribute data across modular storage drive 203n of the portable storage device 104 and one or more of the one or more drives 203 of NASD 102, as reflected in block 704.

FIG. 7B is a flowchart of an example method 710 for servicing a read request for reading data from a RAID of the NASD 102. At block 712, the storage manager 211 determines that a storage request is a read request for reading data from a RAID 240 of the NASD 102. As noted above, the RAID 240 of the NASD 102 may have data distributed across two or more drives of the RAID 240, one of the drives being the modular storage drive 203n. Thus, in order to service a read request, for example, some form of reconstruction and/or data aggregation of the distributed data residing on the NASD's RAID 240 may be required to be performed. Accordingly, the NASD storage manager 211 may reconstruct data from the modular storage drive 203n and one or more of the one or more storage drives 203 of the NASD's RAID as described at block 714 of FIG. 7B. As stated elsewhere herein, the NASD storage manager 211 and the portable storage manager 212 may comprise one or more RAID controllers for performing the operations described elsewhere herein, such as with reference to FIGS. 7A and 7B.

Figure 8:
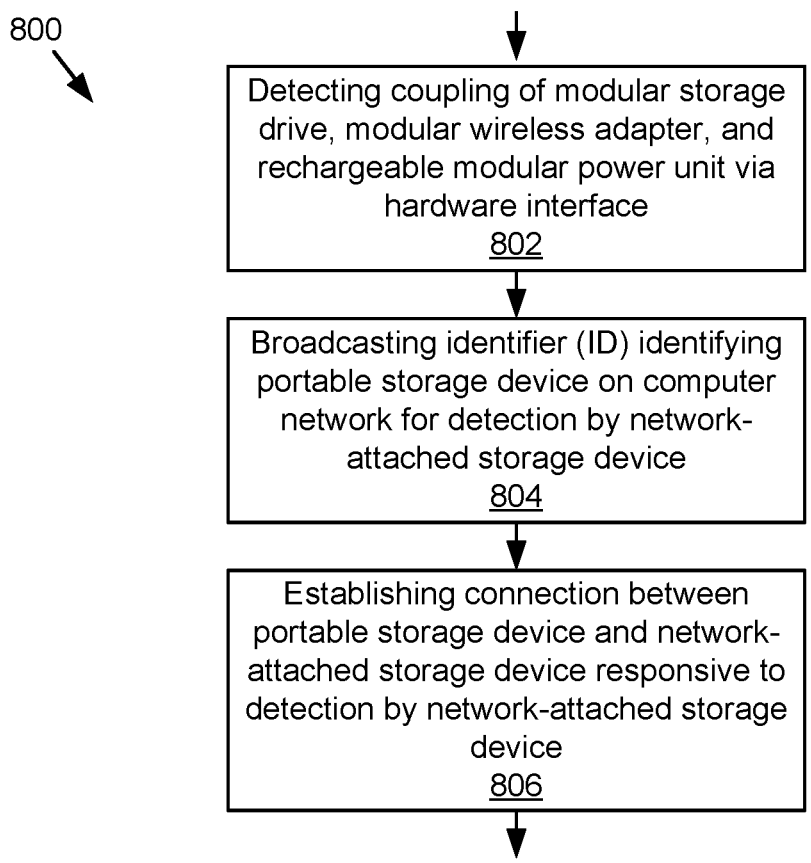
FIG. 8 is a flowchart of an example method for establishing a connection between a NASD and a portable storage device.

FIG. 8 is a flowchart of an example method 800 for establishing a connection between a NASD 102 and a portable storage device 104. At block 802, the portable storage manager 212 detects a coupling of the modular storage drive 203n, the modular wireless adapter 218, and the rechargeable modular power unit 220 via a hardware interface, such as the hardware interface(s) 230 described in FIGS. 3A . . . 3C. This detection may occur responsive to the relevant modular components being detached from the NASD 102 and coupled to form the portable storage device 104, as discussed elsewhere herein.

At block 804, the portable storage manager 212 may broadcast an identifier (ID) identifying the portable storage device 104 on network 107 for detection by the NASD 102 responsive to detecting the coupling. In some embodiments, multiple portable storage devices 104 may be available for detection by the NASD 102 via the network 107. Thus, broadcasting the ID by each portable storage manager 212 or each portable storage device helps to ensure that the NASD storage manager 211 of the NASD 102 can uniquely identify each portable storage device 104, and connect to a specific portable storage device 104 as desired. At block 806, the NASD storage manager 211 of the NASD 102 may establish a connection between the portable storage device 104 and the NASD 102 responsive to the detection by NASD 102. Further embodiments of how the NASD 102 detects and establishes a connection with the portable storage device 104 are discussed elsewhere herein, such as with respect to FIG. 6.

Figure 9:
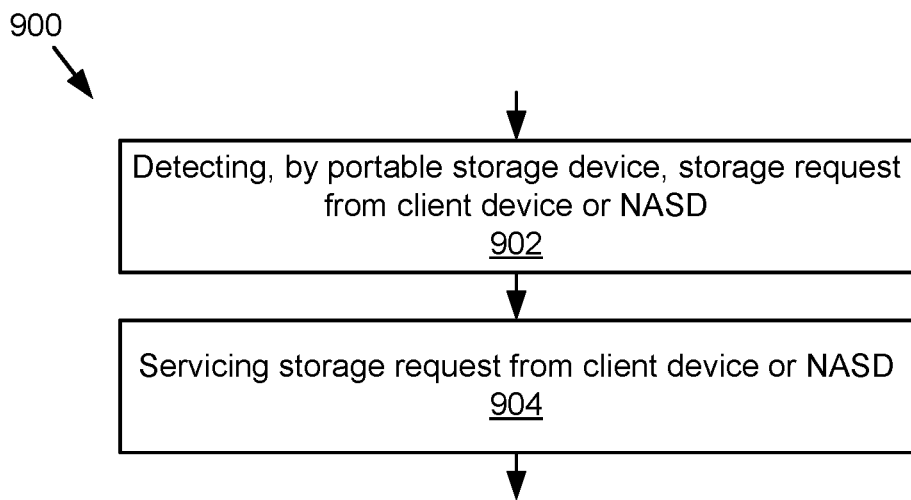
FIG. 9 is a flowchart of an example a method for servicing a storage request from a client to a portable storage device.

FIG. 9 is a flowchart of an example method 900 for servicing a storage request from a client 103 or the NASD 102 at a portable storage device 104. As discussed above with reference to clients 103, the portable storage device 104 may be directly coupled to a client 103 or coupled to client(s) 103 via the network 107. The portable storage device 104 may additionally or alternatively coupled to the NASD 102 via the network 107 (e.g., such as a private or virtual network).

In any case, the coupling of the client 103 or NASD 102 to the portable storage device 104 may facilitate data communication between those components. Thus, at block 902, the portable storage manager 212 may receive a storage request from a client 103 or NASD 102. Example storage requests include REST requests, HTTP requests, object broker request, API calls, object instantiations, method calls, etc. The request may include metadata describing the request (e.g., for a read request, data location(s), virtual address(es), etc.; for a query, query parameters, etc.; for a write request, may include a payload with the data to be written, etc.). In block 904, the portable storage manager 212, in some embodiments, may service the storage request from the client 103 or NASD 102. This may include reading data from, querying data on, deleting data from, and/or writing data to the modular storage drive 203n of the portable storage device 104. For instance, the client 103 or NASD 102 may wirelessly read data from and/or wireless write data to the modular storage drive 203n of the portable storage device 104 via the modular wireless adapter 218 to service the storage request. In other embodiments, the portable storage device 104 may also wirelessly write data to, query data on, delete data from, and/or read data from the client 103 or the NASD 102 to service the storage request.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A modular storage system, comprising:
   a network-attached storage (NAS) device including a base station having a hardware interface including a drive port and a connectivity port;
   a modular storage drive configured to be removeably attached to the drive port of the hardware interface of the base station; and
   a modular wireless adapter configured to be removeably attached to the connectivity port of the hardware interface of the base station, wherein:
      the modular storage drive and the modular wireless adapter are configured to detach from the hardware interface of the base station of the NAS device;
      the modular storage drive further comprises a portable hardware interface with an interface member; and
      the modular wireless adapter is further configured to couple to the interface member of the portable hardware interface to form a portable storage device.

2. The modular storage system of claim 1, further comprising:
   a rechargeable modular power unit attachable to and detachable from a power port, wherein:
      the hardware interface further comprises the power port; and
      the rechargeable modular power unit is configured to:
         couple to the modular storage drive and the modular wireless adapter via the portable hardware interface;
         provide power to the portable storage device while detached from the NAS device and coupled via the portable hardware interface; and
         provide backup power to the NAS device while attached to the power port of the hardware interface of the NAS device.

3. The modular storage system of claim 1, wherein the NAS device further comprises:
   a temporary non-transitory storage device coupleable to the hardware interface; and
   a processor coupled to the hardware interface, wherein the processor is configured to execute logic that performs operations comprising:
      receiving a storage request;
      detecting that the temporary non-transitory storage device is coupled to the hardware interface, the temporary non-transitory storage device configured to function as a fallback for the modular storage drive while the modular storage drive is detached from the hardware interface; and
      servicing the storage request by staging data on the temporary non-transitory storage device.

4. The modular storage system of claim 3, wherein the operations further comprise:
   detecting a coupling of the modular storage drive to the hardware interface of the base station of the NAS device; and
   destaging data from the temporary non-transitory storage device to the modular storage drive responsive to the coupling.

5. The modular storage system of claim 1, wherein the NAS device further comprises a processor coupled to the hardware interface, wherein the processor is configured to execute logic that performs operations comprising:

receiving a storage request;
detecting that the portable storage device is accessible via a computer network; and
servicing the storage request by one of:
   writing data from the NAS device to the modular storage drive of the portable storage device via the computer network; and
   reading data to the NAS device from the modular storage drive of the portable storage device via the computer network.

6. The modular storage system of claim 5, wherein:
the NAS device further comprises one or more storage drives coupled via the hardware interface to the processor; and
the one or more storage drives and the modular storage drive of the portable storage device are configured to comprise a redundant array of independent disks (RAID).

7. The modular storage system of claim 6, wherein:
the storage request is a write request; and
the operations further comprise distributing data across the RAID.

8. The modular storage system of claim 6, wherein:
the storage request is a read request; and
the operations further comprise reconstructing data from the RAID.

9. The modular storage system of claim 1, wherein the drive port comprises one of a universal serial bus (USB) interface, a serial advanced technology attachment (SATA) interface, an integrated drive electronics (IDE) interface, an enhanced IDE (EIDE) interface, a peripheral component interconnect (PCI) interface, a fibre channel interface, a Thunderbolt™ interface, and a serial-attached SCSI (SAS) interface.

10. A portable storage device comprising:
a modular storage drive detached from a network-attached storage (NAS) device;
a modular wireless adapter detached from the NAS device and attached to the modular storage drive via a hardware interface;
a rechargeable modular power unit detached from the NAS device and attached to the modular wireless adapter and the modular storage drive via the hardware interface, wherein the modular storage drive, the modular wireless adapter, and the rechargeable modular power unit are detachable from one another and reattachable to the hardware interface of the NAS device;
means for detecting a coupling of the modular storage drive, the modular wireless adapter, and the rechargeable modular power unit via the hardware interface;
means for broadcasting an identifier (ID) identifying the portable storage device on a computer network for detection by the NAS device; and
means for establishing a connection between the portable storage device and the NAS device responsive to the detection by the NAS device.

11. The portable storage device of claim 10, further comprising:
means for receiving, at the portable storage device, a storage request from the NAS device via the connection; and
means for servicing the storage request using the modular storage drive of the portable storage device.

12. The portable storage device of claim 11, wherein:
the modular storage drive of the portable storage device is configured as a member of a redundant array of independent disks (RAID) managed by the NAS device;
the RAID includes the modular storage drive and one or more storage drives attached to the NAS device;
the storage request is a write request issued by a RAID controller of the NAS device;
servicing the storage request comprises storing a portion of a distributed data set on the modular storage drive; and
the portion of the distributed data corresponds to one or more other portions of the distributed data set stored on one or more of the one or more storage drives of the RAID.

13. The portable storage device of claim 11, wherein:
the modular storage drive of the portable storage device is configured as a member of a redundant array of independent disks (RAID) managed by a RAID controller of the NAS device;
the RAID includes the modular storage drive and one or more storage drives attached to the NAS device;
the storage request is a read request issued by the RAID controller of the NAS device; and
servicing the storage request comprises reconstructing data from the modular storage drive and one or more of the one or more storage drives of the RAID.

14. The portable storage device of claim 10, further comprising:
means for detecting, by the portable storage device, a storage request from a client device; and
means for servicing the storage request from the client device, wherein servicing the storage request from the client device comprises one of: wirelessly reading data from the modular storage drive of the portable storage device; and wirelessly writing data to the modular storage drive of the portable storage device.

15. The portable storage device of claim 10, wherein the hardware interface is integral with one of the modular storage drive, the modular wireless adapter, and the rechargeable modular power unit.

16. The portable storage device of claim 10, wherein:
the hardware interface is an independent component configured to couple the modular storage drive, the modular wireless adapter, and the rechargeable modular power unit; and
the hardware interface comprises:
   a drive port for coupling and decoupling the modular storage drive;
   a connectivity port for coupling and decoupling the modular wireless adapter; and
   a power port for coupling and decoupling the rechargeable modular power unit.

17. A method comprising:
receiving a storage request;
detecting that a portable storage device is accessible via a computer network by a network-attached storage (NAS) device, the portable storage device comprising a modular storage drive detached from a hardware interface of the NAS device and a modular wireless adapter detached from the hardware interface of the NAS device; and
servicing the storage request by one of writing data from the NAS device to the modular storage drive of the portable storage device via the computer network, and reading data to the NAS device from the modular storage drive of the portable storage device via the computer network.

18. The method of claim 17, further comprising:
detecting that a temporary storage device is coupled to the hardware interface of the NAS device, the temporary storage device functioning as a fallback for the modular storage drive detached from the hardware interface of the NAS device; and
servicing the storage request by staging data on the temporary storage device.

19. The method of claim 18, further comprising:
detecting a coupling of the modular storage drive to the hardware interface of the NAS device; and
destaging data from the temporary storage device to the modular storage drive responsive to the coupling.

20. The method of claim 17, further comprising:
coupling a rechargeable modular power unit to the modular storage drive and the modular wireless adapter via a portable hardware interface;
providing power from the rechargeable modular power unit to the portable storage device while detached from the NAS device and coupled via the portable hardware interface; and
providing backup power from the rechargeable modular power unit to the NAS device while attached to a power port of the hardware interface of the NAS device.

* * * * *